(12) United States Patent
Ardura Fernandez et al.

(10) Patent No.: US 9,517,846 B2
(45) Date of Patent: Dec. 13, 2016

(54) DEVICE FOR EXTRACTING AND GATHERING AIR-CONDITIONING HOSES

(71) Applicant: THYSSENKRUPP AIRPORT SYSTEMS S.A., Mieres (Asturias) (ES)

(72) Inventors: José Manuel Ardura Fernandez, Gijón (ES); Jesús Gonzalez Fernandez, Oviedo (ES)

(73) Assignee: THYSSENKRUPP AIRPORT SYSTEMS S.A., Mieres (Asturias) (ES)

( * ) Notice: Subject to any disclaimer, the term of this patent is extended or adjusted under 35 U.S.C. 154(b) by 0 days.

(21) Appl. No.: 14/758,134

(22) PCT Filed: Jan. 8, 2014

(86) PCT No.: PCT/ES2014/070007
§ 371 (c)(1),
(2) Date: Jun. 26, 2015

(87) PCT Pub. No.: WO2014/108590
PCT Pub. Date: Jul. 17, 2014

(65) Prior Publication Data
US 2015/0329220 A1   Nov. 19, 2015

(51) Int. Cl.
*B64F 1/36* (2006.01)
*F24F 13/02* (2006.01)
*B65H 75/36* (2006.01)

(52) U.S. Cl.
CPC .......... *B64F 1/362* (2013.01); *B65H 75/362* (2013.01); *F24F 13/0218* (2013.01);
(Continued)

(58) Field of Classification Search
CPC ............... B64F 1/362; Y10T 137/6962; Y10T 137/6906; Y10T 137/6943; Y10T 137/6918; Y10T 137/6932; F24F 13/0218
See application file for complete search history.

(56) References Cited

U.S. PATENT DOCUMENTS 3,882,565 A    5/1975   Irwin et al.
3,933,382 A *  1/1976   Counts ............... E05B 47/0012
                                                160/201
(Continued)

FOREIGN PATENT DOCUMENTS

EP    2 085 311 A2    8/2009

OTHER PUBLICATIONS

International Search Report for PCT/ES2014/070007 filed Jan. 8, 2014.

*Primary Examiner* — Atif Chaudry
(74) *Attorney, Agent, or Firm* — Notaro, Michalos & Zaccaria P.C.

(57) ABSTRACT

Device for extracting and collecting air conditioning hoses, has a flexible hose with a perimeter relief, rolled up as a helicoid along the same, a storage body inside which the hose is housed according to a longitudinal shaft of the same and a tractor unit, connected to the storage body, which also has an extraction and collection mechanism configured to extract and collect the hose. The extraction and collection mechanism has one or more helicoidal spindles, in contact with the perimeter relief, each one of which is configured to rotate according to a rotation shaft parallel to the longitudinal shaft, the rotation of which gives rise to a push force on the relief, which causes a linear displacement of the hose along the length of the longitudinal shaft.

11 Claims, 8 Drawing Sheets

(52) U.S. Cl.
CPC .... *Y10T 137/6906* (2015.04); *Y10T 137/6918* (2015.04); *Y10T 137/6932* (2015.04); *Y10T 137/6943* (2015.04); *Y10T 137/6954* (2015.04); *Y10T 137/6962* (2015.04)

(56) References Cited

U.S. PATENT DOCUMENTS

| | | |
|---|---|---|
| 4,153,966 A | 5/1979 | Irwin |
| 2009/0197516 A1* | 8/2009 | Wright ................... B64F 1/362 |
| | | 454/119 |

\* cited by examiner

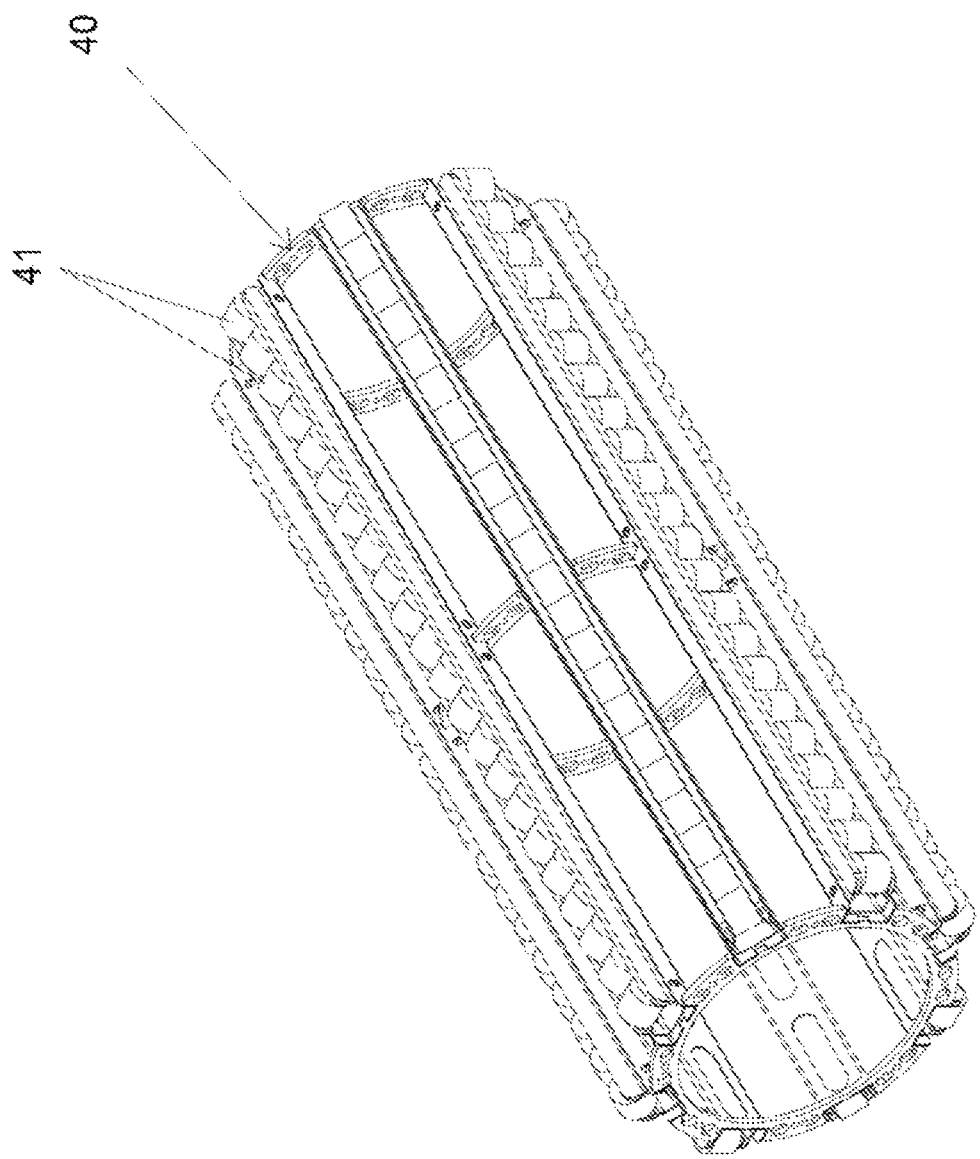

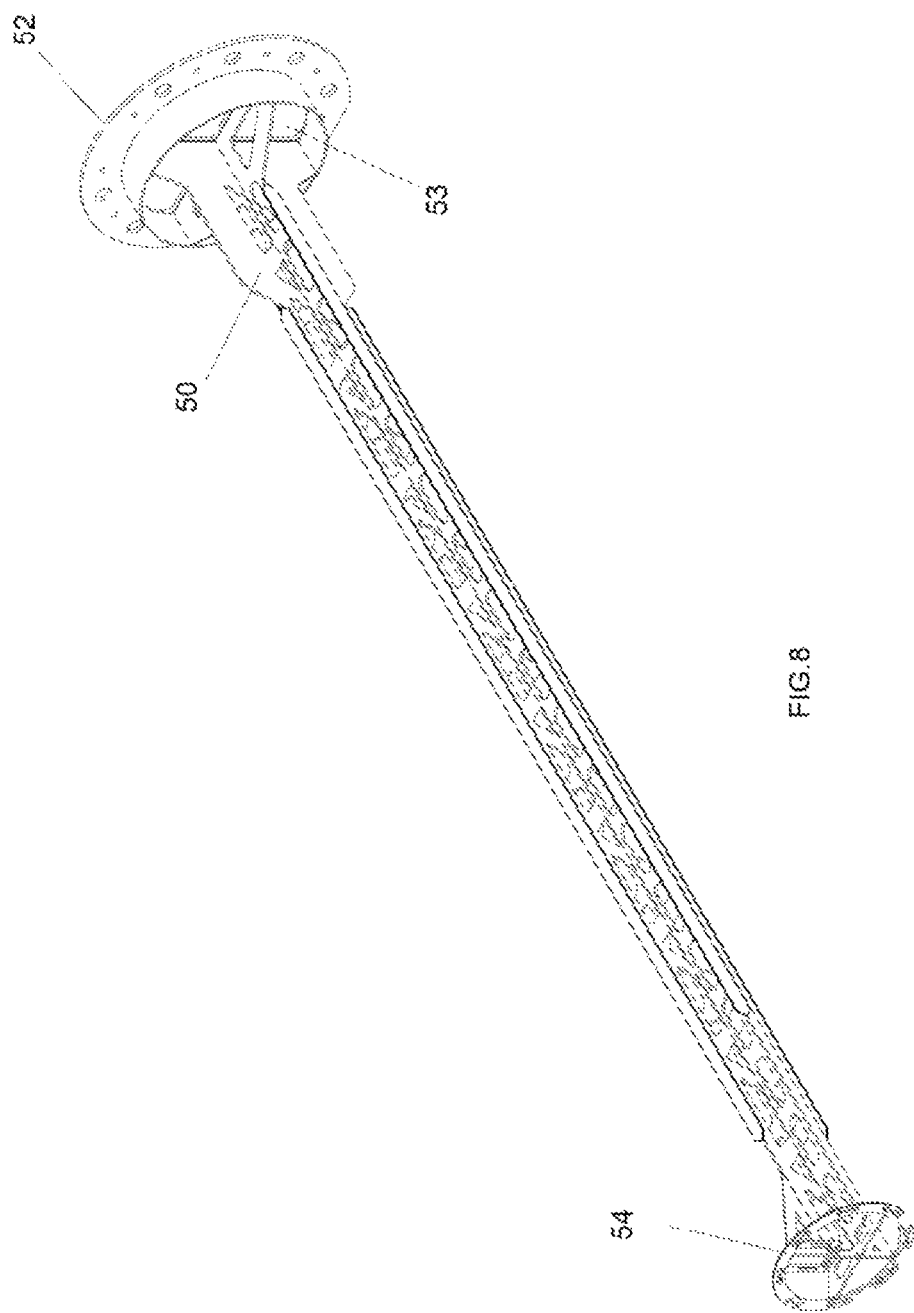

DEVICE FOR EXTRACTING AND GATHERING AIR-CONDITIONING HOSES

FIELD OF THE INVENTION

The present invention refers to a device for extracting and collecting air conditioning hoses, of the variety usually employed in airport terminals in order to supply air conditioning to aircraft when on the ground.

BACKGROUND OF THE INVENTION

The air supplied to aircraft when on the ground is produced in independent machines or specific places in airport terminals, being channelled towards aircraft by means of various systems. The most common include using channels embedded in the airport platform, conducts located on the same platform or via telescopic conducts located in the passenger boarding walkways.

With the above cases, the final few meters of said channels are usually formed by textile hoses, which are usually insulated and extremely flexible in order to enable them to be connected to aircraft easily, the use of tubes or rigid hoses therefore being discarded given that the same are difficult to manipulate.

Although the connection point to said channels systems is always found at a fixed point, quite the contrary occurs with aircraft air intake vents. More specifically, aircraft have air intake vents located in various places along their fuselage, depending on the model of the aircraft. Therefore, the distance between the connection points in said systems and the air intake vents in aircraft varies depending on the aircraft model.

For this reason, the flexible hoses employed to connect the channels systems to the aircraft must be variable in length, usually between 3 and 24 meters long, lengths of approximately 50 meters even being needed in certain aeroplanes.

When the flexible hose is not supplying air to aircraft, it is stored in a deposit or store, usually located beneath the boarding walkway. In other cases, it is usually rolled up in a drum or compressed inside a compartment, also located beneath the walkway. In the specific case of channels systems embedded in the airport platform the hose is usually deposited at the bottom of a compartment.

When it is supplying air to the aircraft, the hose must be completely extended, it being necessary for it to be fully extracted from its location, independently of the length required to supply each aircraft, given that were this not the case, air would not circulate inside the hose.

Having to extract the entire hose even when not necessary, the length between the fixed point of the system and the air intake vent of the aircraft being very short, presents various limitations:

- The larger the amount of hose extracted, the greater the temperature and pressure loss between the fixed point of the system and the aircraft vent.
- The entire hose extended on the platform is an obstacle for people carrying out their work in the aircraft connections area.
- The hose wears down too much after rubbing against the platform floor.
- The entire hose being extended in its totality results in the same becoming twisted, bent and clogged, thereby resulting in insufficient air flow therein.

In this sense, some devices used to extract and collect air conditioning hoses are known about, which prevent the entire hose from having to be extracted, offering the possibility of extracting the exact hose length required in each case, whilst in turn guaranteeing that air is supplied to the aircraft correctly. Amongst such devices, those documented in WO2012/024062A and EP2085311A2 might be mentioned.

The recovery device object of document WO2012/024062A1 reveals a storage body and a tractor unit. A flexible hose is housed in the storage body, according to a longitudinal shaft of the same, crossed by a plurality of support bars. The tractor unit comprises extraction and collection means, configured to extract and collect a frontal end of the hose. Said means are formed by a motorized lateral fastening mechanism, formed by a number of pincers, which open or close around the flexible hose in order to free or fasten the same, respectively. The lateral fastening mechanism is joined to an extraction and collection mechanism, capable of sliding horizontally, in a direction parallel to the support bars. The repetitive forwards and backwards movements of the extraction and collection mechanism, each time freeing and gripping the hose, enable a horizontal extraction or collection movement of said hose.

The main limitation of this device is the discontinuous movement of the hose, in terms of both the extraction and collection thereof. In other words, the hose comes out little by little, the movement being interrupted each time the pincers repeat the freeing and fastening process relative to the same, in coordination with the sliding of the extraction and collection device. It therefore constitutes a slow extraction and collection process. Another limitation is that it requires a significant number of motors, requiring at least one for each pincer and another for horizontal sliding. In turn, this increases the cost and implies greater risk of break down. Finally, the pincers gripping the hose is usually quite aggressive, especially if the force of the pincer or the distance thereof relative to the hose is not adjusted accordingly and may therefore cause serious damage to the same.

The recovery device object of document EP2085311A2 also reveals a storage body and a tractor unit. A flexible hose is housed within a storage body, according to a longitudinal shaft of the same, crossed by a support beam. The tractor unit comprises extraction and collection means configured to extract and collect a frontal end of the hose. Said means are formed by an electric redactor motor, which moves a pinion system and a chain. The pinions transmit a rotational movement onto four shafts parallel to the support beam and around the same. In turn, said shafts transmit the movement onto four collection devices, each one of which causes a collection belt to rotate, according to a rotation shaft perpendicular to the longitudinal shaft of the storage body. Each one of these belts is in contact with the external surface of the flexible hose, in order to exert a friction force that enables a horizontal extraction or collection movement of the same.

This device does indeed enable continuous movement of the hose, in terms of both the extraction and collection thereof. However, it presents other significant limitations. In this sense, although it only has one single motor, the gear system for transmitting the movement of the same to the collection belts is in fact complicated. More specifically, the motor output shaft and belt rotation shaft are perpendicular to one another and in turn, perpendicular to the longitudinal shaft of the device. In other words, they are perpendicular to the movement of the hose. They all have a large number of transmission elements. In addition, each collection device needs at least four pulleys in order to maintain the tension needed to guarantee contact with the hose. Finally, the friction force that enables the horizontal extraction or collection movement of the hose is quite high and therefore somewhat aggressive for the hose, potentially causing serious damage to the same.

The present invention resolves the problems set out above in a fully satisfactory way, using a device for extracting and collecting air conditioning hoses, which simplifies the configuration of the extraction and collection means found in known systems. These means are based on the use of one or more helicoidal spindles in contact with the hose, which rotate on a rotation shaft parallel to the longitudinal shaft of the device, thus giving rise to a linear displacement of the hose along the length of said longitudinal shaft. The displacement occurs as a result of the push force exerted uniformly on a stretch of hose, thus moderating the friction on the same and reducing the wear thereof.

DESCRIPTION OF THE INVENTION

The device for extracting and collecting air conditioning hoses object of the present invention comprises:
- a flexible hose, with:
  - an external surface, the perimeter of which is in relief, rolled up as a helicoid along the length of the same,
  - an internal surface,
  - a rear end and
  - a frontal end
- a storage body, inside which the hose is housed according to a longitudinal shaft of the same, having:
  - a rear wall with an air input, connected to the rear end of the hose and
- a tractor unit connected to the storage body, with:
  - a frontal wall with an extraction and collection nozzle and
  - extraction and collection means configured to extract and collect the frontal end of the hose via the extraction and collection nozzle.

Flexible hoses for supplying air to aircraft formed by various layers of textile material currently exist on the market, including a number of layers of insulating materials, with a metal ring or relief around the perimeter, rolled up as a helicoid along the length of the same. This helicoidal ring of relief enables the hose to preserve its circular shape at all times, thereby facilitating airflow inside the same. Said helicoidal ring or relief means that the textile material from which the hose is made does not experience excessive wear when it is dragged along the airport platform.

The device object of the present invention is characterised in that the extraction and collection means comprise one or more helicoidal spindles in contact with the relief around the perimeter, each one of which is configured to rotate according to a rotation shaft parallel to the longitudinal shaft, the rotation of which gives rise to a push force on said relief, in turn causing the hose to move linearly along the length of the longitudinal shaft.

According to a preferred embodiment, the storage body and tractor unit are connected via an intermediate wall, each one of the helicoidal spindles (31) being arranged horizontally between said intermediate wall and the frontal wall, around the hose. Other structural configurations are possible, which may not include said intermediate wall, for example fastening the helicoidal spindles by means of side walls, parallel to the same or other structural elements.

The device preferably comprises for helicoidal spindles arranged around the hose, which enable the push force to be distributed more uniformly, thereby preventing said hose from undergoing brusque puling movements or other undesired deformations. According to the size of the spindles, a greater number of the same may be arranged, if considered opportune in terms of uniformity/cost. Each helicoidal spindle preferably comprises a transmission end and a driven end, configured to enable said helicoidal spindle to be fastened and rotated.

In order to simplify the configuration of the extraction and collection means, they comprise a motor that actuates a transmission pinion and a transmission chain, which engages with the transmission pinion and with the helicoidal spindles in order to cause the same to rotate. The extraction and collection means preferably comprise a plurality of driven pulleys arranged on the intermediate wall, around the hose, which engage with the transmission chain. The transmission chain in turn engages with the transmission end of each helicoidal spindle.

According to a preferred embodiment, the device for extracting and collecting air conditioning hoses, object of the present invention, comprises a frontal support with cylindrical configuration, arranged inside the hose as it passes through the tractor unit, configured to support the hose and prevent the same from becoming deformed. Said frontal support comprises one or more paths with surface rollers, in contact with the internal surface of the hose in order to encourage the displacement thereof.

According to a preferred embodiment, the device for extracting and collecting air conditioning hoses, object of the present invention, comprises a rear support configured in a straight line, by way of a beam, arranged inside the hose as it passes through the storage body, configured to support the hose and prevent deformations which make it difficult for air to pass through the same. Said rear support comprises a first connection end with the rear wall, which defines a number of openings for air to pass through via the air input and a second connection end with the frontal body. The rear support preferably comprises a containment structure for the hose around the same.

BRIEF DESCRIPTION OF THE DRAWINGS

Below is a brief description of a series of drawings, which facilitate a better understanding of the invention and relate expressly to a preferred embodiment thereof, presenting a non-limiting example of the same.

FIG. 7 is a perspective view of the frontal support.

FIG. 8 is a perspective view of the rear support.

DETAILED DESCRIPTION OF THE INVENTION

Figure 1:
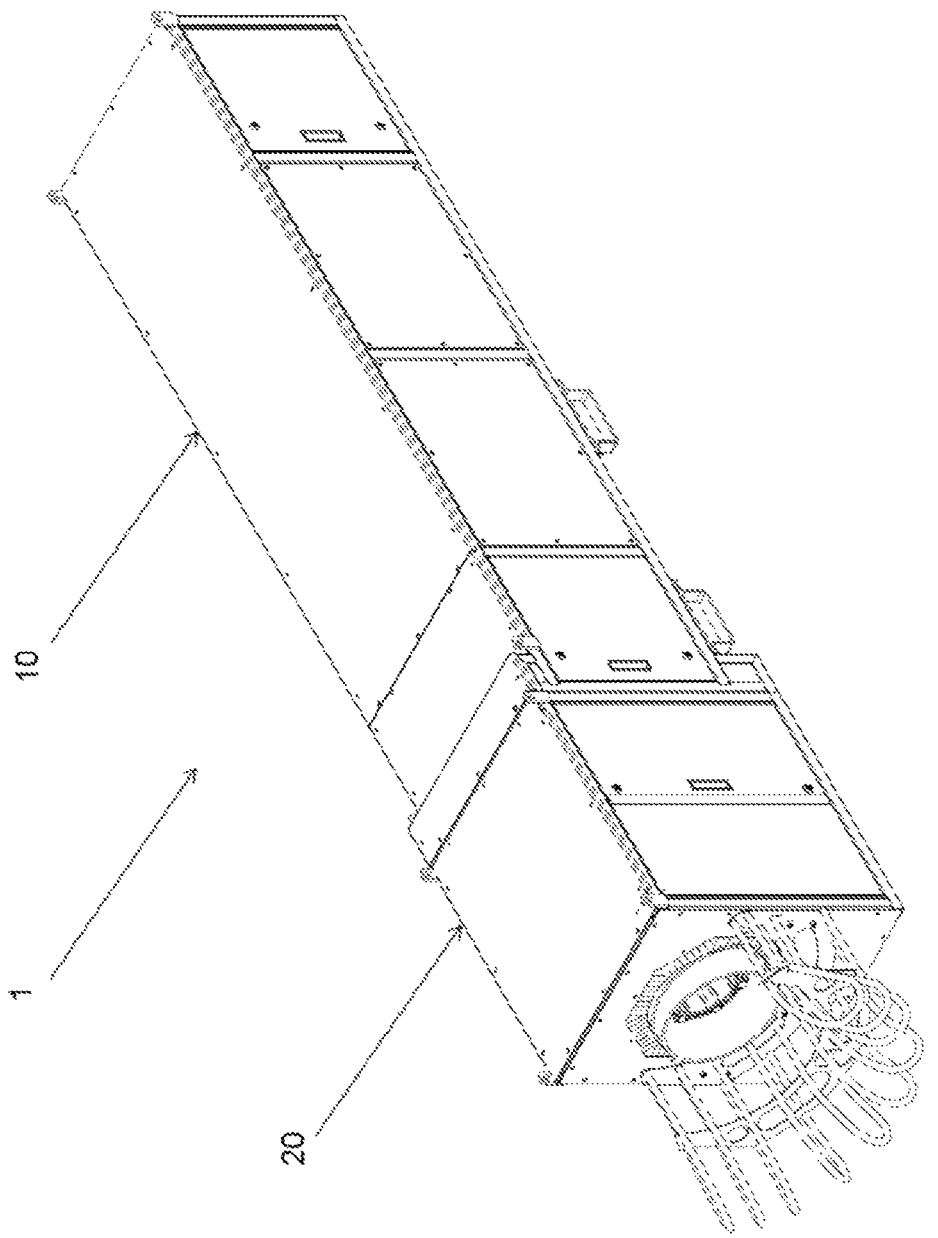
FIG. 1 is a perspective view of the extraction and collection device, object of the present invention.

FIG. 1 is a perspective view of the extraction and collection device (1), object of the present invention.

Figure 2:
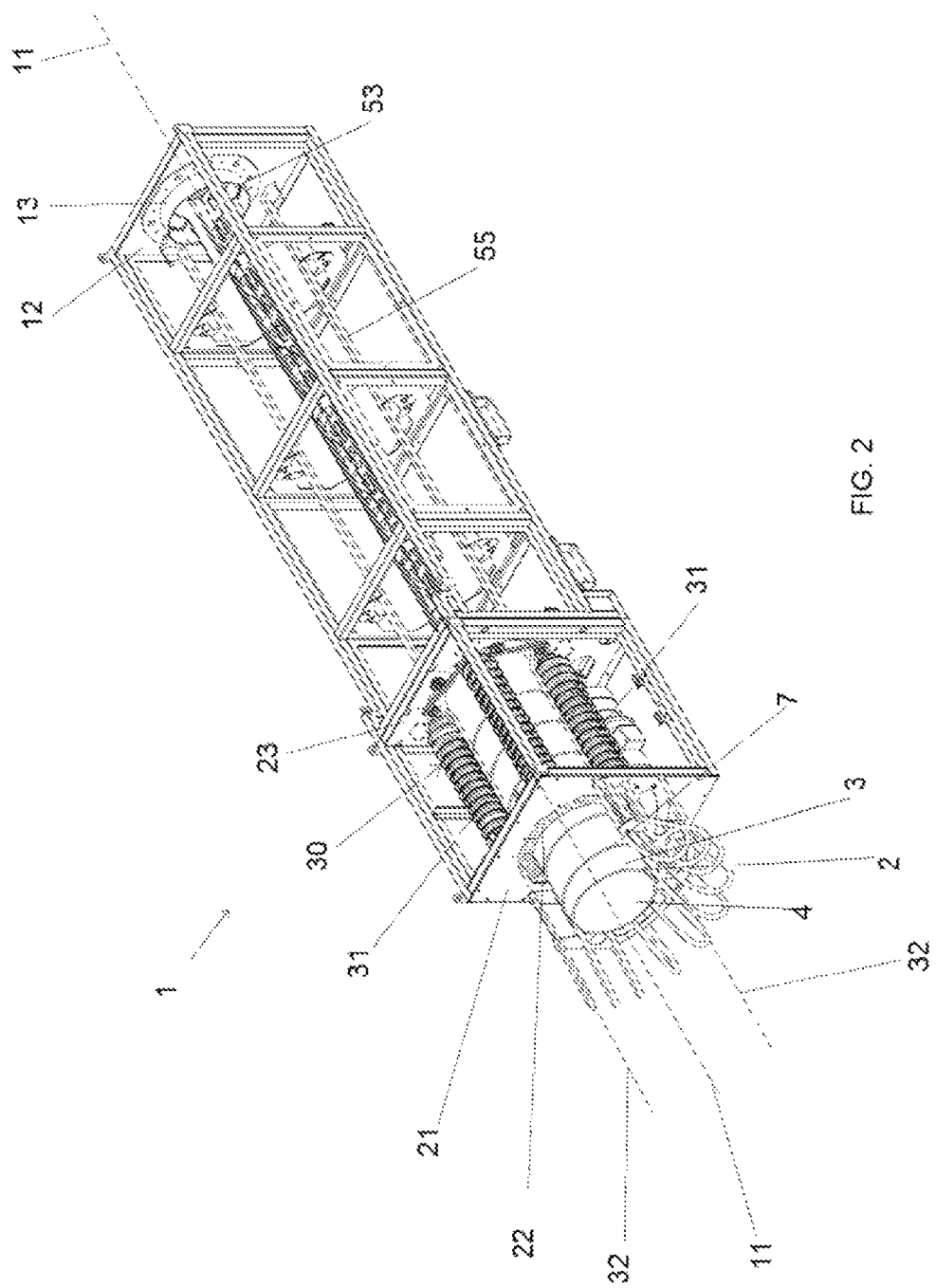
FIG. 2 is a perspective view of the device, demonstrating the inside thereof.
Figure 3:
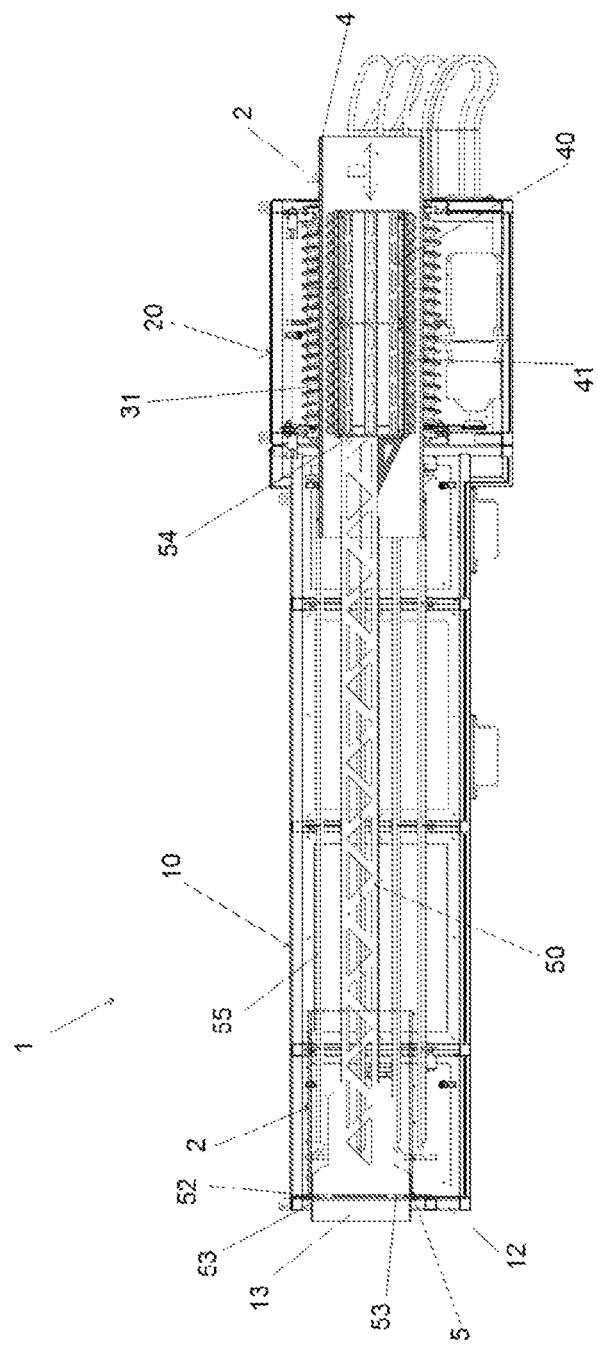
FIG. 3 represents a longitudinal section of the device.

FIGS. 2 and 3 are perspective views of the inside of the device (1) and a longitudinal section of the same, wherein it is possible to observe the various components from which it is composed. FIG. 2 only illustrates the frontal end (6) of the flexible hose (2) for clarity purposes, whilst FIG. 3 does not illustrate the intermediate stretch thereof.

As can be seen, the device (1) for extracting and collecting air conditioning hoses, object of the present invention, comprises:

a flexible hose (2 with:
- an external surface (3) with a relief around the perimeter (7), rolled up as a helicoid along the length of the same,
- an internal surface (4),
- a rear end (5) and
- a frontal end (6), a storage body (10), inside which the hose (2) is housed according to a longitudinal shaft (11) of the same, having:
- a rear wall (12) with an air input (13), connected to the rear end (5) of the hose (2) and a tractor unit (20), connected to the storage body (10), which has:
- a frontal wall (21) with an extraction and collection nozzle (22) and
- extraction and collection means (30) configured to extract and collect the frontal end (6) of the hose (2) via the extraction and collection nozzle (22).

Figure 4:
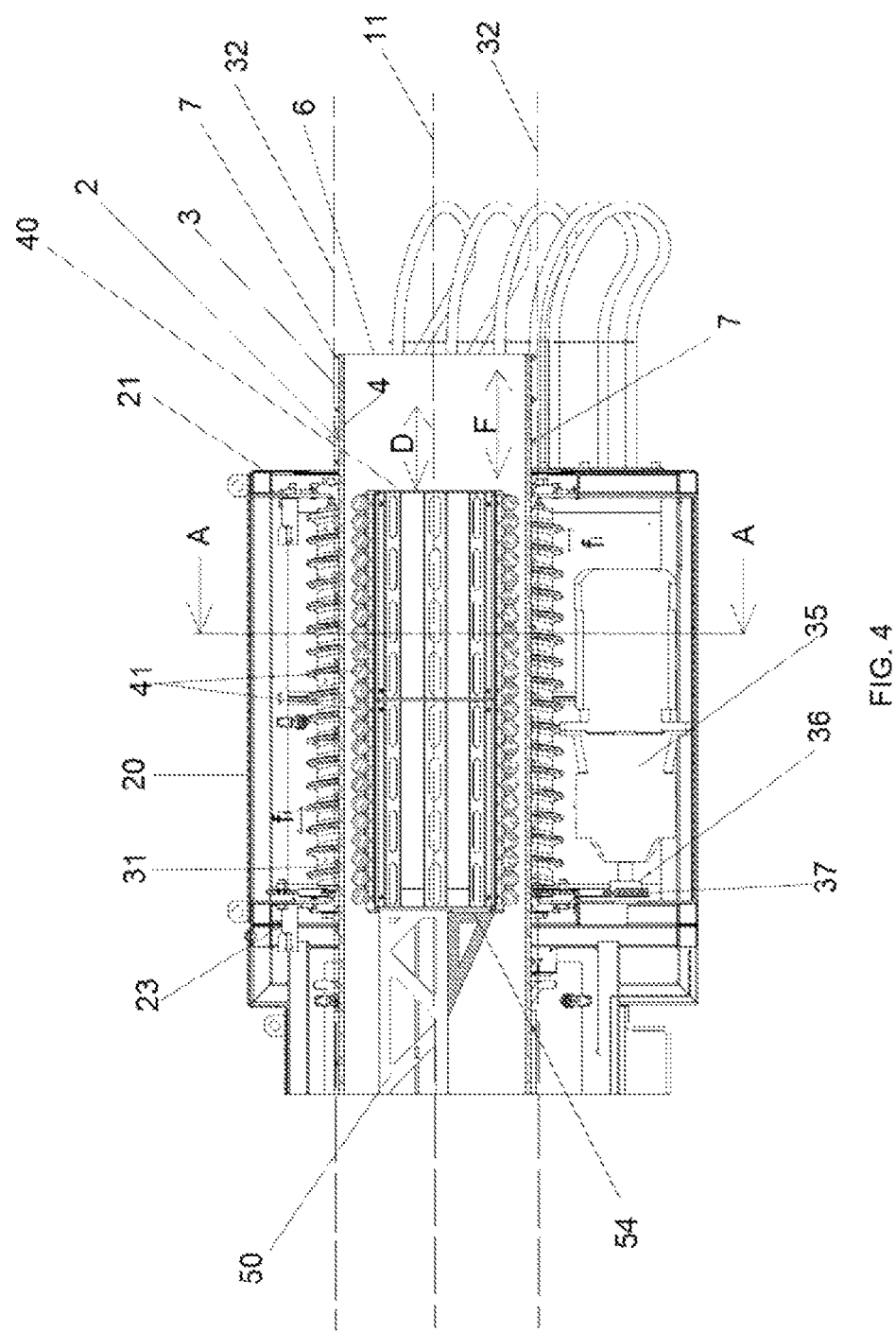
FIG. 4 is a detailed view of FIG. 3, showing the tractor unit.

According to the present example of a preferred embodiment, the extraction and collection means (30) comprise four helicoidal spindles (31) in contact with the perimeter relief (7), each one of them configured to rotate according to a rotation shaft (32) parallel to the longitudinal shaft (11), the rotation of which gives rise to a push force (F), FIG. 4, upon said relief (7), which gives rise to a linear displacement (D) for collection or extraction of the hose (2) along the length of the longitudinal shaft (11).

According to the present example of a preferred embodiment, the storage body (10) and the tractor unit (20) connect via an intermediate wall (23), each one of the helicoidal spindles (31) being arranged horizontally between said intermediate wall (23) and the frontal wall (21) around the hose (2).

The device (1) comprises a frontal support (40) with cylindrical configuration, arranged inside the hose (2) as it passes through the tractor unit (20), configured to support the hose (2) and prevent the same from becoming deformed. Said frontal support (40) comprises a plurality of surface roller paths (41) in contact with the internal surface (4) of the hose (2) in order to encourage the displacement thereof.

The device (1) comprises a rear support (50) configured in a straight line, by way of a beam, arranged inside the hose (2) as it passes through the storage body (10), configured to support he hose (2) in both folded and unfolded position, facilitating the passage of air through the same at all times. Said rear support (50) comprises a first connection end (52), connected to the rear wall (12), which defines a number of openings (52) for air to pass through via the air input (13) and a second connection en (54), connected to the frontal body (40). The rear support (50) comprises a containment structure (55) for the hose (2) around the same.

FIG. 4 provides a detailed view of that shown in FIG. 3, focusing on the tractor unit (20), wherein it is possible to observe the action of the helicoidal spindles (31) on the hose (2) more clearly, in order to enable the extraction and collection thereof, depending on the rotational direction of the extraction and collection means (30). Each helicoidal spindle (31) comes into contact with the perimeter relief (7) at one or more points of the same, depending on the position thereof at each moment relative to the hose (2). The rotation of the spindle (31) generates a partial push force ($f_j$) a each one of these contact points, the total push force (F) enabling the hose (2) to be collected and extracted being equal to the sum of partial push forces ($f_j$) I.e. $F=\Sigma f_j$.

Figure 5:
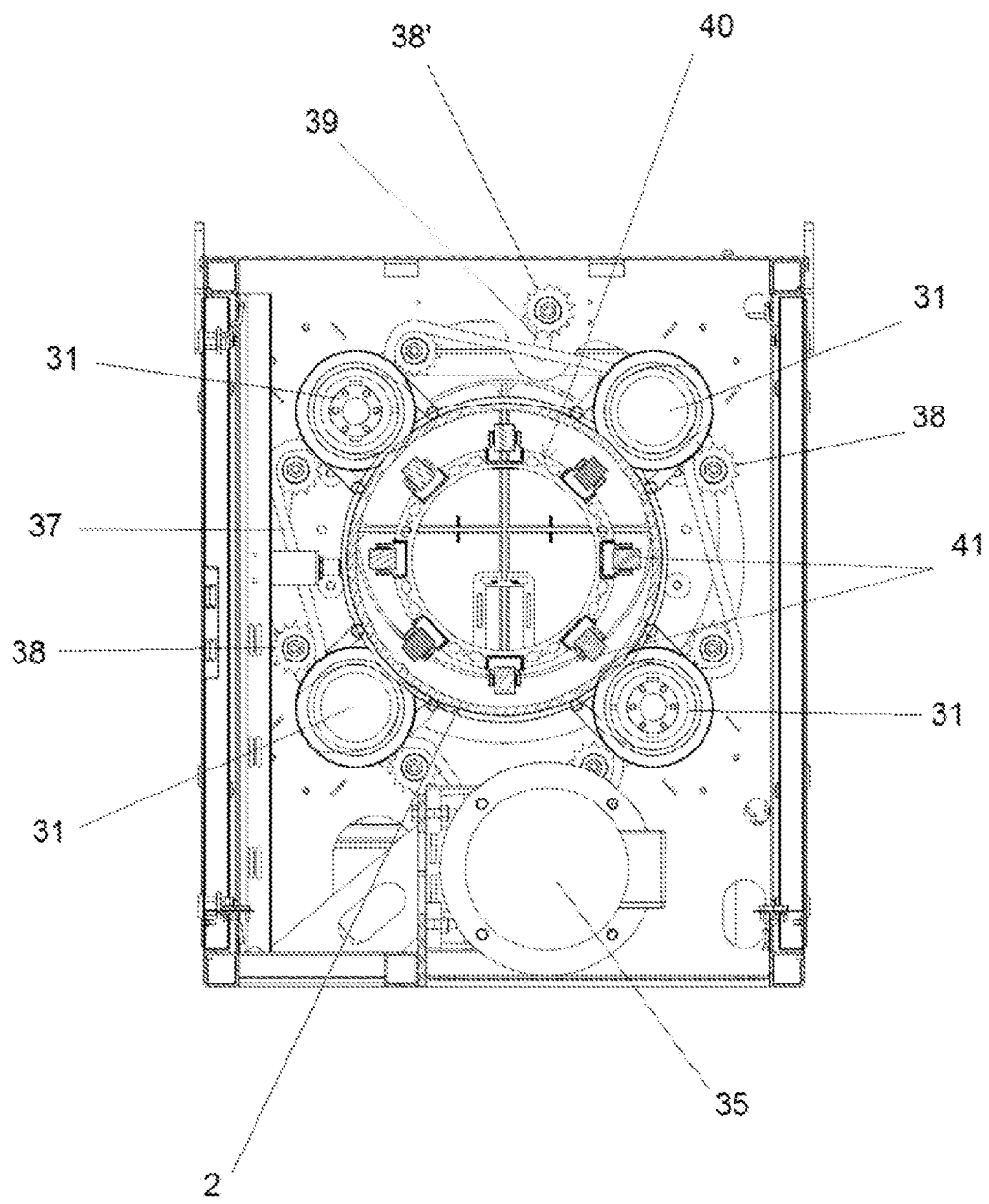
FIG. 5 represents a cross-section of the device, according to the cut line A-A shown in FIG. 4

FIG. 5 represents a cross section of the device according to the cut line A-A shown in FIG. 4, wherein it is possible to observe the extraction and collection means (30) more clearly. The four helicoidal spindles (31) are arranged around the hose (2) in order to distribute the push force (F) in a more uniform way, thereby preventing said hose (2) from undergoing brusque pulling actions or other undesired deformations, in turn resulting in a more uniform movement of the hose (2).

The extraction and collection means (30) comprise a motor (35) which actuates a transmission pinion (36), (see FIG. 4) and a transmission chain (37), which engages with the transmission pinion (36) and with the helicoidal spindles (31) in order to give rise to the rotation thereof. The extraction and collection means (30) comprise a plurality of driven pulleys (38) arranged on the intermediate wall (23), around the hose (2), which engage with the transmission chain (37). The transmission chain (37) in turn engages with the transmission end (33) of each helicoidal spindle (31), FIG. 6. A tension pulley (38') which may slide along the length of a runner (39) comes into contact with the transmission chain (37) in order to facilitate the tensing thereof.

Figure 6:
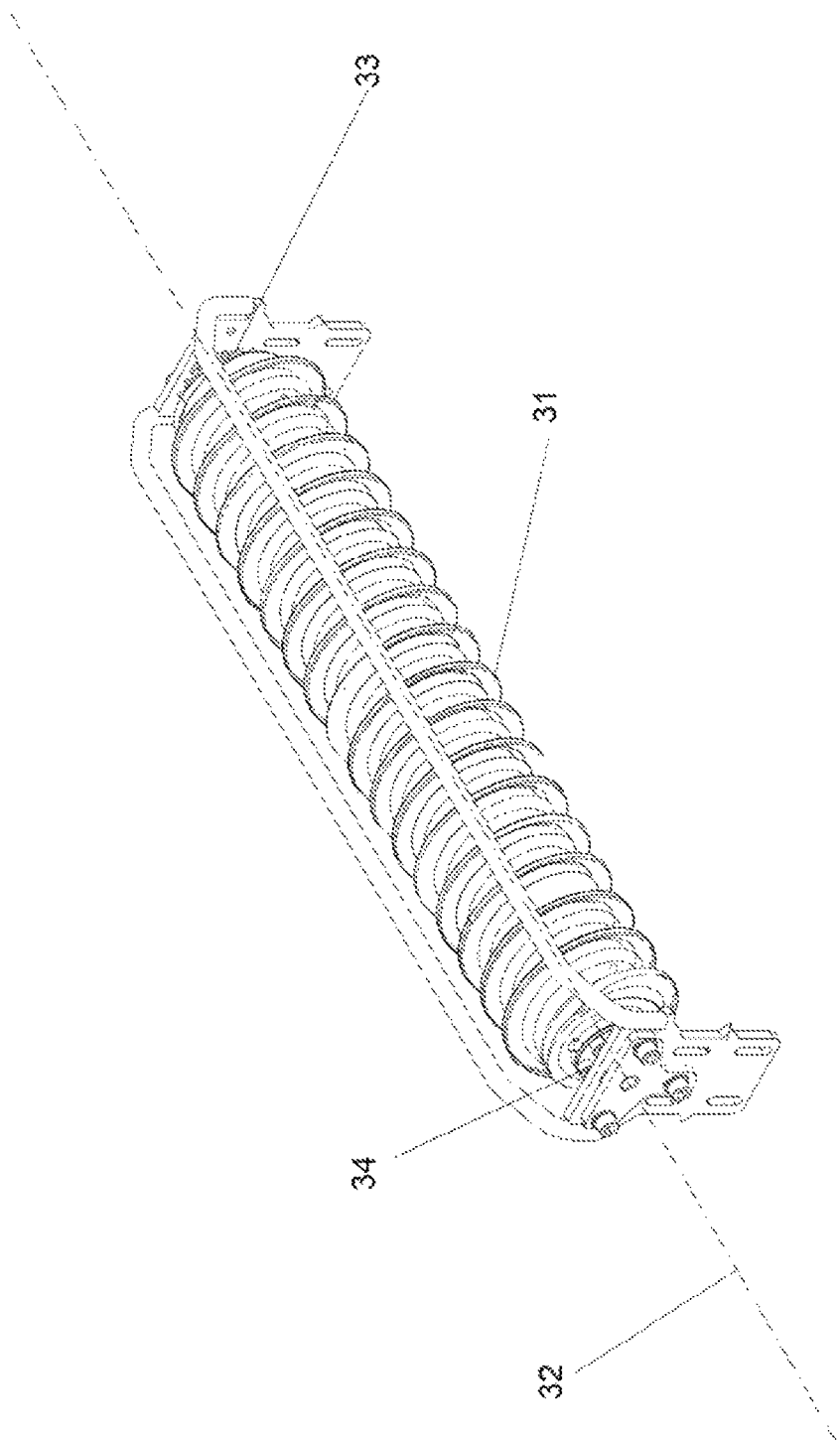
FIG. 6 is a perspective view of a helicoidal spindle.

FIG. 6 is a perspective view of a helicoidal spindle (31). As can be seen, each helicoidal spindle (31) comprises a transmission end (33) and a driven end (34), configured to facilitate the fastening and rotation of said helicoidal spindle (31).

FIGS. 7 and 8 are more detailed representations of the frontal support (40) and rear support (50), respectively.

The invention claimed is:

1. A device for extracting and collecting air conditioning hoses, comprising:

a flexible hose (2), with:
- an external surface (3) with a perimeter relief (7) rolled up as a helicoid along the same,
- an internal surface (4),
- a rear end (5), and
- a frontal end (6), a storage body (10), inside which the hose (2) is housed according to a longitudinal shaft (11) of the same, having:
- a rear wall (12) with an air input (13) that connects to the rear end (5) of the hose (2); and a tractor unit (20), which connects to the storage body (10), having:
- a frontal wall (21), which has an extraction and collection nozzle (22), and
- extraction and collection means (30) configured to extract and collect the frontal end (6) of the hose (2) via the extraction and collection nozzle (22), said device (1) being characterised in that the extraction and collection means (30) comprise one or more helicoidal spindles (31) in contact with the perimeter relief (7), each one of which is configured to rotate according to a rotation shaft (32) parallel to the longitudinal shaft (11), the rotation of which gives rise to a push force (F) on said relief (7), in turn resulting in the linear displacement (D) of the hose (2) along the length of the longitudinal shaft (11);

wherein the storage body (10) and tractor unit (20) connect via an intermediate wall (23), each one of the helicoidal spindles (31) being arranged horizontally between said intermediate wall (23) and the frontal wall (21) around the hose (2); and wherein the extraction and collection means (30) comprise a plurality of driven pulleys (38) arranged on the intermediate wall (23) around the hose (2) which engage with a transmission element (37), and wherein the transmission element (37) in turn engages with the transmission end (33) of each helicoidal spindle (31).

2. Device for extracting and collecting air conditioning hoses according to claim 1, characterised in that it comprises four helicoidal spindles (31).

3. Device for extending and collecting air conditioning hoses according to claim 1, characterised in that each helicoidal spindle (31) comprises a transmission end (33) and a driven end (34), configured to facilitate the fastening and rotation of said helicoidal spindle (31).

4. Device for extracting and collecting air conditioning hoses according to claim 1, characterised in that the extraction and collection means (30) comprise a motor (35) that actuates a transmission pinion (36) and a transmission chain (37), which engages with a transmission pinion (36) and with the helicoidal spindles (31), in order to give rise to the rotation thereof.

5. Device for extracting and collecting air conditioning hoses according to claim 1, characterised in that it comprises a frontal support (40) with a cylindrical configuration, arranged inside the hose (2) as it passes through the tractor unit (20), configured to support the hose (2) and prevent the same from becoming deformed.

6. Device for extracting and collecting air conditioning hoses according to claim 5, characterised in that the frontal support (40) comprises one or more surface roller paths (41) in contact with the internal surface (4) of the hose (2) in order to encourage the displacement thereof.

7. Device for extracting and collecting air conditioning hoses according to claim 5, characterised in that a rear support (50) comprises a second end (54) connected to the frontal body (40).

8. Device for extracting and collecting air conditioning hoses according to claim 1, characterised in that it comprises a rear support (50) configured in a straight line, arranged inside the hose (2) as it passes through the storage body (10), configured to support the hose (2).

9. Device for extracting and collecting air conditioning hoses according to claim 8, characterised in that the rear support (50) comprises a first end (52) connected to the rear wall (12), which defines a number of openings (53) for the air to flow through via the air input (13).

10. Device for extracting and collecting air conditioning hoses according to claim 8, characterised in that the rear support (50) comprises a containment structure (55) for the hose (2) around the same.

11. Device for extracting and collecting air conditioning hoses according to claim 1,
wherein said transmission element (37) comprises a transmission chain (37).

* * * * *